United States Patent
Ryu et al.

(10) Patent No.: US 11,205,049 B2
(45) Date of Patent: Dec. 21, 2021

(54) METHOD FOR MANAGING SEMANTIC INFORMATION ON M2M/IOT PLATFORM

(71) Applicant: Korea Electronics Technology Institute, Seongnam-si (KR)

(72) Inventors: Min Woo Ryu, Seoul (KR); Jae Ho Kim, Seongnam-si (KR); Il Yeup Ahn, Yongin-si (KR); Jae Seok Yun, Yongin-si (KR); Sung Chan Choi, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 131 days.

(21) Appl. No.: 16/099,048

(22) PCT Filed: May 2, 2017

(86) PCT No.: PCT/KR2017/004649
§ 371 (c)(1),
(2) Date: Nov. 5, 2018

(87) PCT Pub. No.: WO2017/191977
PCT Pub. Date: Nov. 9, 2017

(65) Prior Publication Data
US 2019/0197108 A1    Jun. 27, 2019

(30) Foreign Application Priority Data
May 5, 2016   (KR) .................. 10-2016-0055861

(51) Int. Cl.
*G06F 40/30*    (2020.01)
*G06Q 50/10*    (2012.01)
(Continued)

(52) U.S. Cl.
CPC .............. *G06F 40/30* (2020.01); *G06F 16/31* (2019.01); *G06F 16/3335* (2019.01); *G06Q 50/10* (2013.01); *H04W 4/70* (2018.02)

(58) Field of Classification Search
CPC ...... G06F 16/3335; G06F 40/30; G06F 16/31; G06F 17/27; G06F 16/33; G06F 16/23;
(Continued)

(56) References Cited

U.S. PATENT DOCUMENTS 10,057,074 B2 *   8/2018   Zhuang .................. H04L 12/10
10,599,478 B1 *   3/2020   Ghare ....................... G06F 9/50
(Continued)

FOREIGN PATENT DOCUMENTS

KR    10-2016-0008526 A    1/2016
KR    10-2016-0009613 A    1/2016

OTHER PUBLICATIONS

Human Language Query Processing in Temporal Database using Semantic Grammar 1. K.Murugan, 2. T.Ravichandran 1. Asst. Professor, Hindus than Institute of Technology, Tamil Nadu, India. 2. Principal, Hindus than Institute of Technology, Coimbatore, Tamil Nadu, India.*

(Continued)

*Primary Examiner* — Hicham Skhoun
(74) *Attorney, Agent, or Firm* — NSIP Law

(57) ABSTRACT

A method for managing semantic information on an M2M/IoT platform is provided. The method for managing semantic information according to an embodiment of the present invention stores semantic data in the first attribute of an M2M resource and updates a part of the semantic data stored in the first attribute. Accordingly, efficient management of semantic information on an M2M/IoT platform is possible, and particularly a partial update of the semantic information can be performed.

10 Claims, 5 Drawing Sheets

(51) Int. Cl.
*H04W 4/70* (2018.01)
*G06F 16/33* (2019.01)
*G06F 16/31* (2019.01)

(58) Field of Classification Search
CPC ......... G06F 16/24; G06F 16/36; G06Q 50/10; H04W 4/70
USPC ....................................................... 707/812
See application file for complete search history.

(56) References Cited

U.S. PATENT DOCUMENTS

| | | | | |
|---|---|---|---|---|
| 2006/0173804 A1* | 8/2006 | Desai | ................ | G06F 16/86 |
| 2007/0276815 A1* | 11/2007 | Naibo | ................ | G06F 16/951 |
| 2011/0238683 A1* | 9/2011 | Kim | ................ | G06F 16/2452 |
| | | | | 707/760 |
| 2013/0318070 A1* | 11/2013 | Wu | ................ | G06F 16/284 |
| | | | | 707/722 |
| 2015/0195365 A1* | 7/2015 | Choi | ................ | H04W 4/021 |
| | | | | 715/739 |
| 2016/0004767 A1* | 1/2016 | Song | ................ | G06F 16/951 |
| | | | | 707/769 |
| 2016/0019294 A1* | 1/2016 | Dong | ................ | G06F 16/367 |
| | | | | 707/794 |
| 2016/0132368 A1* | 5/2016 | Nano | ................ | G06F 8/41 |
| | | | | 717/140 |
| 2016/0196132 A1* | 7/2016 | Searle | ................ | H04L 41/082 |
| | | | | 717/173 |
| 2017/0094592 A1* | 3/2017 | Tabatabaei | ................ | H04W 48/16 |
| 2017/0208139 A1* | 7/2017 | Li | ................ | H04W 4/70 |
| 2017/0272894 A1* | 9/2017 | Wang | ................ | G06Q 10/10 |
| 2018/0314689 A1* | 11/2018 | Wang | ................ | G10L 15/22 |

OTHER PUBLICATIONS

International Search Report dated May 5, 2016 in International Patent Application No. PCT/KR2017/004649 (3 pages in Korean).
Korean Office Action dated May 22, 2020 in corresponding Korean Patent Application No. 10-2016-0055861 (3 pages in English, 5 pages in Korean).
Li et al., "Enabling Semantics in an M2M/IoT Service Delivery Platform," 2016 IEEE Tenth International Conference on Semantic Computing, Feb. 4, 2016, pp. 207-213.

* cited by examiner

FIG. 2

```
<rdf:RDF
<rdf:Description rdf:about="http://www.tno.com/saref#WASH_LG_123">
<rdf:type rdf:resource="http://www.tno.com/saref#WashingMachine"/>
<saref:hasManufacturer>LG</saref:hasManufacturer>
<saref:hasDescription>VerycoolWashingMachine</saref:hasDescription>
<saref:hasLocation rdf:resource="http://www.tno.com/saref#Bathroom"/>
<msm:hasService rdf:resource="http://www.tno.com/saref#WashingService_123"/>
<msm:hasService rdf:resource="http://www.tno.com/saref#StateService_123"/>
</rdf:Description>
```

FIG. 3

| Attribute Name | Request Optionality ||
| --- | --- | --- |
| | Create | Update |
| *resourceName* | O | NP |
| *resourceType* | NP | NP |
| *resourceID* | NP | NP |
| *parentID* | NP | NP |
| *expirationTime* | O | O |
| *accessControlPolicyIDs* | O | O |
| *creationTime* | NP | NP |
| *lastModifiedTime* | NP | NP |
| *labels* | O | O |
| *announceTo* | O | O |
| *announcedAttribute* | O | O |
| *creator* | O | NP |

FIG. 4

| Attribute Name | Request Optionality | | Data Type | Default Value and Constraints |
|---|---|---|---|---|
| | Create | Update | | |
| descriptorRepresentation | M | O | m2m:descriptorRepresentation | application/rdf+xml:1 |
| semanticOpExec | NP | O | m2m:sparql | No default |
| descriptor | M | O | xs:base64Binary | No default |
| ontologyRef | O | O | xs:anyURI | No default |
| relatedSemantics | O | O | List of xs:anyURI | No default |

US 11,205,049 B2

METHOD FOR MANAGING SEMANTIC INFORMATION ON M2M/IOT PLATFORM

CROSS REFERENCE TO RELATED APPLICATIONS

This application is a U.S. National Stage Application of International Application No. PCT/KR2017/004649, filed on May 2, 2017, which claims the benefit under 35 USC 119(a) and 365(b) of Korean Patent Application No. 10-2016-0055861, filed on May 5, 2016, in the Korean Intellectual Property Office.

TECHNICAL FIELD

The present disclosure relates to machine to machine/Internet of Things (M2M/IoT) technology, and more particularly, to a method for managing semantic information on an M2M/IoT platform.

BACKGROUND ART

FIG. 1 is the view illustrating a structure of a <semanticDescriptor> resource which is usable in M2M/IoT.

The <semanticDescriptor> resource is a resource which is used to store semantic description of an M2M/IoT resource and its sub resources.

As shown in FIG. 1, the <semanticDescriptor> includes a "descriptor" attribute, an "ontologyRef" attribute, and a "relatedSemantics" attribute, and includes a <subscription> resource as a sub resource.

The "descriptor" attribute stores semantic data (semantic triple), specifically, one or more semantic data as a set. The set of semantic data stored in the "descriptor" attribute is illustrated in FIG. 2.

The M2M/IoT platform is required to interwork with other protocols/standards/technologies, but methods for create/retrieve/update/delete semantic information to achieve interworking have not been suggested.

Accordingly, there is a demand for a method for managing semantic information effectively and efficiently on an M2M/IoT platform.

DISCLOSURE

Technical Problem

The present disclosure has been developed in order to address the above-discussed deficiencies of the prior art, and an object of the present disclosure is to provide a method for managing semantic information efficiently on an M2M/IoT platform.

In addition, another objective of the present disclosure is to provide a method for representing semantic information stored in an M2M/IoT platform on a web.

Technical Solution

According to an embodiment of the present disclosure to achieve the above-described objectives, a method for managing semantic information includes: storing semantic data in the first attribute of an M2M resource; and updating a part of the semantic data stored in the first attribute.

In addition, the update may include receiving a request including the second attribute having a query contained thereon, for searching the semantic data stored in the first attribute.

In addition, the update may further include, when the first attribute and the second attribute are included in the request, returning an error message.

In addition, the update may further include, when there is an error in a result of syntax validation of the query, returning an error message.

In addition, the update may include updating a part of the semantic data stored in the first attribute according to an update request contained on the second attribute.

In addition, the method may further include, when a request including the first attribute is received, updating all of the semantic data.

In addition, the M2M resource may further include the third attribute which stores data for representing the semantic data included in the first attribute on a web.

According to another embodiment of the present disclosure, a system for managing semantic information includes: a storage configured to store an M2M resource including the first attribute which stores semantic data; and a processor configured to update a part of the semantic data stored in the first attribute.

Advantageous Effects

According to embodiments of the present disclosure as described above, semantic information on the M2M/IoT platform can be managed efficiently, and in particular, a part of the semantic information can be updated.

In addition, according to embodiments of the present disclosure, it is possible to represent semantic information stored in the M2M/IoT platform on a web.

DESCRIPTION OF DRAWINGS

FIG. 2 is the view illustrating a set of semantic data stored in a "descriptor" attribute;

FIG. 3 is the view illustrating universal/common attributes of a <semanticDescriptor> resource applicable according to an embodiment of the present disclosure;

FIG. 4 is the view illustrating specific attributes of the <semanticDescriptor> resource applicable according to an embodiment of the present disclosure;

BEST MODE

Hereinafter, the present disclosure will be described in more detail with reference to the drawings.

1. <SemanticDescriptor> Resource Structure

A structure of a <semanticDescriptor> resource for representing a set of semantic data stored in a "descriptor" attribute of the <semanticDescriptor> resource on a web, and for updating a part of the set of semantic data will be described in detail with reference to FIGS. 3 and 4.

FIG. 3 is the view illustrating universal/common attributes of the <semanticDescriptor> resource applicable according to an embodiment of the present disclosure.

As shown in FIG. 3, the <semanticDescriptor> resource includes, as universal/common attributes, "resourceName," "resourceType," "resourceID," "parentID," "expiration- Time," "accessControlPolicyIDs," "creationTime," "last-ModifiedTime," "labels," "announceTo," "announcedAttribute," and "creator."

FIG. 4 is the view illustrating resource specific attributes of the <semanticDescriptor> resource applicable according to an embodiment of the present disclosure.

In FIG. 4, an attribute name, a request optionality, a data type, and a default value and constraints regarding the specific attributes of the <semanticDescriptor> resource are defined.

As shown in FIG. 4, the specific attributes of the <semanticDescriptor> resource include "descriptorRepresenation," "semanticOpExec," "descriptor," "ontologyRef" and "relatedSemantics."

The "descriptorRepresenation" attribute is an attribute which stores data for representing the <semanticDescriptor> resource on a web, and stores data for representing a set of semantic data stored in the "descriptor" attribute on a web.

The "semanticOpExec" attribute is an attribute for searching the set of semantic data stored in the <semanticDescriptor> resource, and may include a SPARQL query and a SPARQL update request necessary for partially updating the set of semantic data created/stored in the "descriptor" attribute.

By adding the "semanticOpExec" attribute, the search for partially updating the set of semantic data is possible without changing a RESTful interface.

2. Create/Retrieve/Update/Delete of the <SemanticDescriptor> Resource

Hereinafter, a create/retrieve/update/delete (CRUD) operation process of the <semanticDescriptor> resource will be described in detail.

Figure 1:
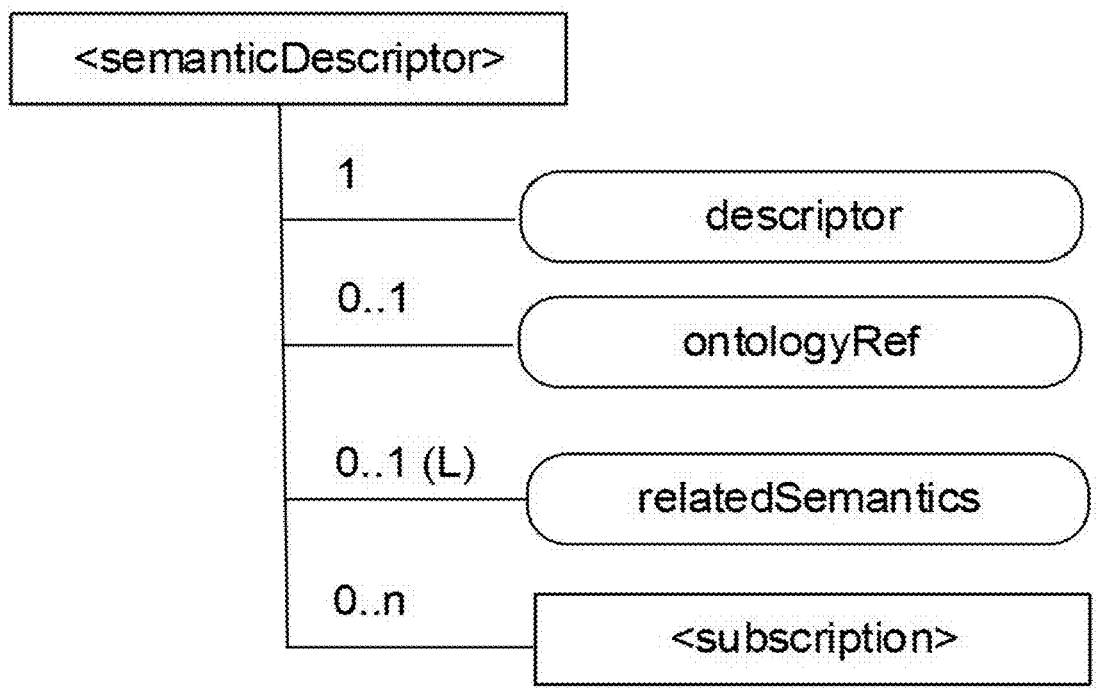
FIG. 1 is the view illustrating a structure of a <semanticDescriptor> resource which is usable in M2M/IoT.
Figure 5:
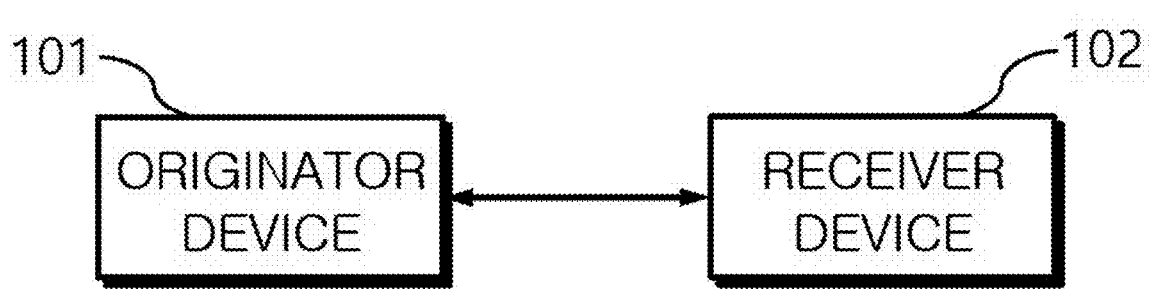
FIG. 5 is the view illustrating an interaction between an originator device and a receiver device, for performing a create/retrieve/update/delete (CRUD) operation.

The CRUD operation is performed by an interaction between an originator device 101 and a receiver device 102 as shown in FIG. 5.

The originator 101 is a device which requests the CRUD operation, and may correspond to a gateway, a server, an M2M/IoT platform as well as nodes.

The receiver 102 is a device which performs the CRUD operation request of the originator 101, and may correspond to nodes, a gateway, a server, etc. as well as an M2M/IoT platform.

2.1 Create

Hereinafter, a procedure for creating a <semanticDescriptor> resource will be described.

Upon receiving a request for creation of the <semanticDescriptor> resource from the originator 101, the receiver 102 performs the <semanticDescriptor> resource creation procedure according to the request.

To achieve this, the receiver 102 performs syntax validation with respect to the set of semantic data included in the "descriptor" attribute of the <semanticDescriptor> resource. For example, a hosting common service entity (CSE) of the receiver 120 may check whether the "descriptor" attribute conforms to the RDF/XML syntax.

When there is a syntax problem in the "descriptor" attribute, the receiver 102 does not create the <semanticDescriptor> resource, and returns a failure message (failure information) and additional error information to the originator 101.

On the other hand, when there is no syntax problem in the "descriptor" attribute, the receiver 102 creates the <semanticDescriptor> resource according to the corresponding request.

2.2 Retrieve

Upon receiving a request for retrieval of the <semanticDescriptor> resource from the originator 101, the receiver 102 performs the <semanticDescriptor> resource retrieval procedure according to the request.

In response to the retrieval request, the receiver 102 does not return the "semanticOpExec" attribute.

2.3 Update Procedure

The "descriptor" attribute may be updated by using SPARQL. Updating is consists of update for the all sets of semantic data stored in the "descriptor" attribute, and update for only a part of the sets of semantic data.

2.3.1 Whole Update

In the whole update, the originator 101 sends an update request having the "descriptor" attribute contained thereon to the receiver 102.

When both the "semanticOpExec" attribute and the "descriptor" attribute exist in the <semanticDescriptor> update request received from the originator 101, the receiver 102 returns an error message to the originator 101.

When the "descriptor" attribute is included in the <semanticDescriptor> update request received from the originator 101, the receiver 102 performs syntax validation to check whether the syntax of its content corresponds to a valid RDF/XML syntax. When there is an error in the result of validation, the receiver 102 returns an error message to the originator 101.

On the other hand, when there is no error in the result of validation, the receiver 102 updates all sets of semantic data stored in the "descriptor" attribute according to the update request.

2.3.2 Partial Update

In the partial update, the originator 101 generates a request for update of the "semanticOpExec" attribute and sends the request to the receiver 102. The value of this attribute is set to a SPARQL request that includes INSERT, DELETE, or DELETE/INSERT with conditional SPARQL statements as defined in the SPARQL query language.

Then, the receiver 102 checks validity of resource representation, first.

To achieve this, when both the "semanticOpExec" attribute and the "descriptor" attribute exist in the <semanticDescriptor> update request received from the originator 101, the receiver 102 returns an error message to the originator 101.

When the "semanticOpExec" attribute is included in the <semanticDescriptor> update request received from the originator 101, the receiver 102 performs syntax validation to check whether the syntax of its content corresponds to a valid SPARQL query request. When there is an error in the result of validation, the receiver 102 returns an error message to the originator 101.

On the other hand, when there is no error in the result of validation, the hosting CSE of the receiver 102 updates only a part of the sets of semantic data (semantic triples) stored in the "descriptor" attribute according to the SPARQL update request.

To achieve this, the SPARQL update request existing in the "semanticOpExec" attribute included in the <semanticDescriptor> update request specifically defines the semantic data to be updated and contents to be updated.

When the update is impossible according to the SPARQL update request, the receiver 102 returns an error message to the originator 101.

2.4 Delete

Upon receiving a deletion request of the <semanticDescriptor> resource from the originator 101, the receiver 102 performs a <semanticDescriptor> resource deletion procedure according to the request.

3. Device

Figure 6:
FIG. 6 is a detailed block diagram of the originator device and the receiver device.

FIG. 6 is a detailed block diagram of the originator device 101 and the receiver device 102. Since the originator device 101 and the receiver device 102 may include the same configuration, FIG. 6 illustrates only one device by using reference numeral "100" as a representative.

As shown in FIG. 6, the device 100 includes a communication unit 110, a processor 120, and a storage 130.

The communication unit 110 is a communicating means for communicating with the other device, and the processor 120 performs a procedure necessary for performing the CRUD operation. The storage 130 provides a storage space necessary for the processor 120 to perform the CRUD operation, and stores resources.

The technical idea of the present disclosure may be applied to a computer-readable recording medium which records a computer program for performing the functions of the apparatus and the method according to the present embodiment. In addition, the technical idea according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A method for managing semantic information, the method comprising:
   storing sematic data in a first attribute of plural machine-to-machine (M2M) resources; and
   performing an update with respect to the semantic data stored in the first attribute, depending on a type of an attribute included in a received request, wherein
   in response to the type of the attribute included in the received request being determined to correspond to the first attribute, the method include performing an entire update of all of the semantic data stored in the first attribute, and
   in response to the type of the attribute included in the received request being determined to correspond to a second attribute of the plural M2M resources, the second attribute corresponding to searching the semantic data stored in the first attribute, the method include performing a partial update of a part of the semantic data stored in the first attribute,
   wherein the first attribute and the second attribute are the type of the attribute and different types of the attribute from each other, and
   wherein, for the performing the update, the method further comprises, when both the first attribute and the second attribute are included in the received request, returning an error message.

2. The method of claim 1, wherein, for the performing the update, the method further comprises receiving the received request comprising the second attribute having a query contained thereon for searching the semantic data stored in the first attribute.

3. The method of claim 1, wherein, for the performing the update, the method further comprises, when there is an error in a result of syntax validation of a query including the received request, returning an other error message.

4. The method of claim 1, wherein the plural M2M resources further comprises a third attribute which stores data for representing the semantic data included in the first attribute on a web.

5. A system for managing semantic information, the system comprising:
   a processor configured to:
   store, in a storage, plural machine-to-machine (M2M) resources comprising a first attribute which stores semantic data; and
   perform an update with respect to the semantic data stored in the first attribute, depending on a type of an attribute included in a received request, wherein
   in response to the type of the attribute included in the received request being determined to correspond to the first attribute, the processor is configured to perform an entire update of all of the semantic data stored in the first attribute, and
   in response to the type of the attribute included in the received request being determined to correspond to a second attribute of the plural M2M resources, the second attribute corresponding to searching the semantic data stored in the first attribute, the processor is configured to perform a partial update of a part of the semantic data stored in the first attribute,
   wherein the first attribute and the second attribute are the type of the attribute and a different type from each other, and
   wherein, for the performing the update, the processor is further configured to, when the first attribute and the second attribute are included in the received request, returning an error message.

6. The system of claim 5, wherein, for the performing the update, the processor is further configured to receive the received request comprising the second attribute having a query contained thereon, for searching the semantic data stored in the first attribute.

7. The system of claim 5, wherein, for the performing the update, the processor is further configured to, when there is an error in a result of syntax validation of a query including the received request, return an other error message.

8. The system of claim 5, wherein the plural M2M resources further comprises a third attribute which stores data for representing the semantic data included in the first attribute on a web.

9. The system of claim 7, wherein the processor is further configured to perform the syntax validation of the query.

10. The method of claim 3, wherein the method further comprises performing the syntax validation of the query.

* * * * *